June 25, 1963 L. E. DARWIN 3,095,020
FUELING MECHANISM FOR AUTOMOBILES
Filed Sept. 22, 1960 3 Sheets-Sheet 1
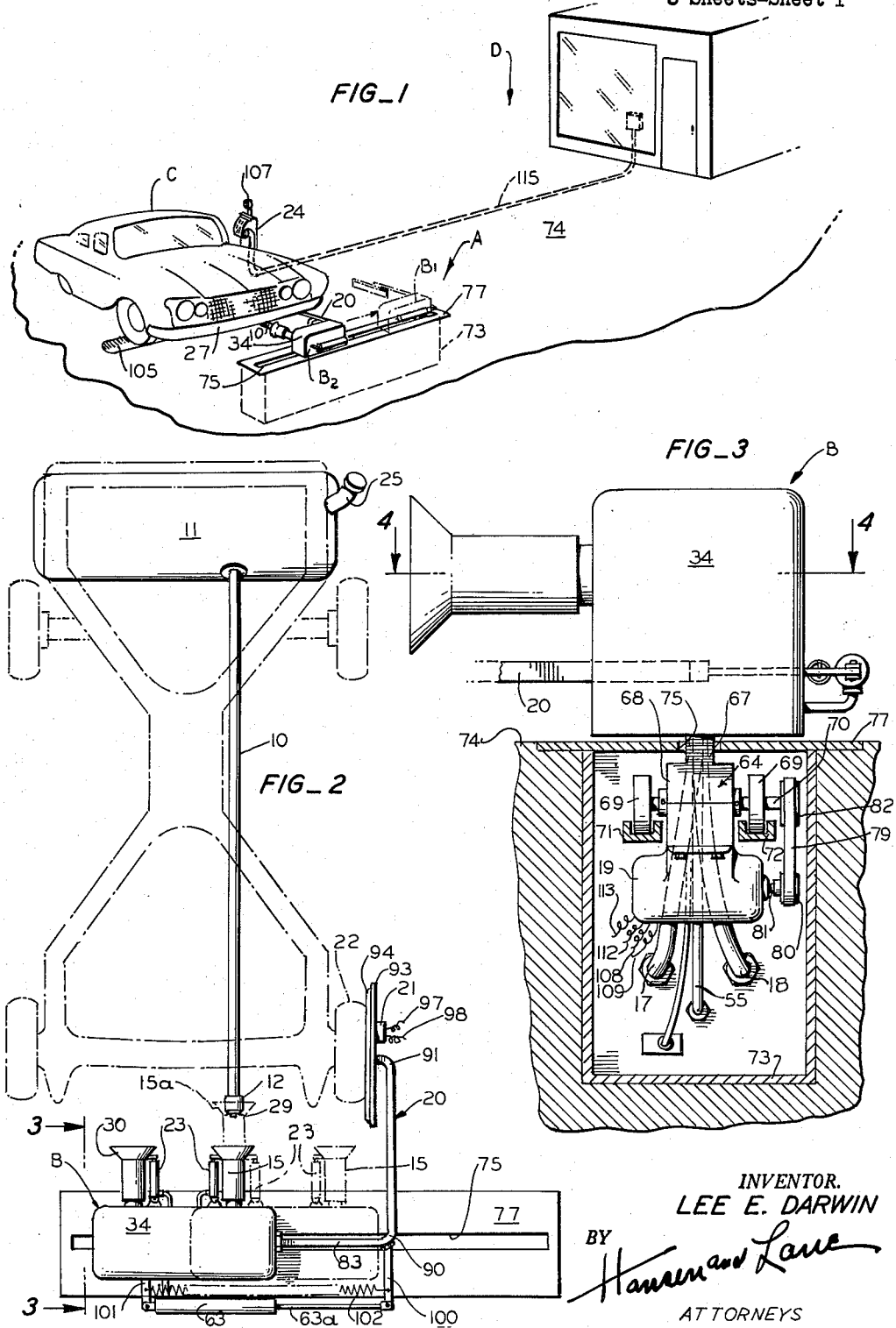
INVENTOR.
LEE E. DARWIN
BY
ATTORNEYS

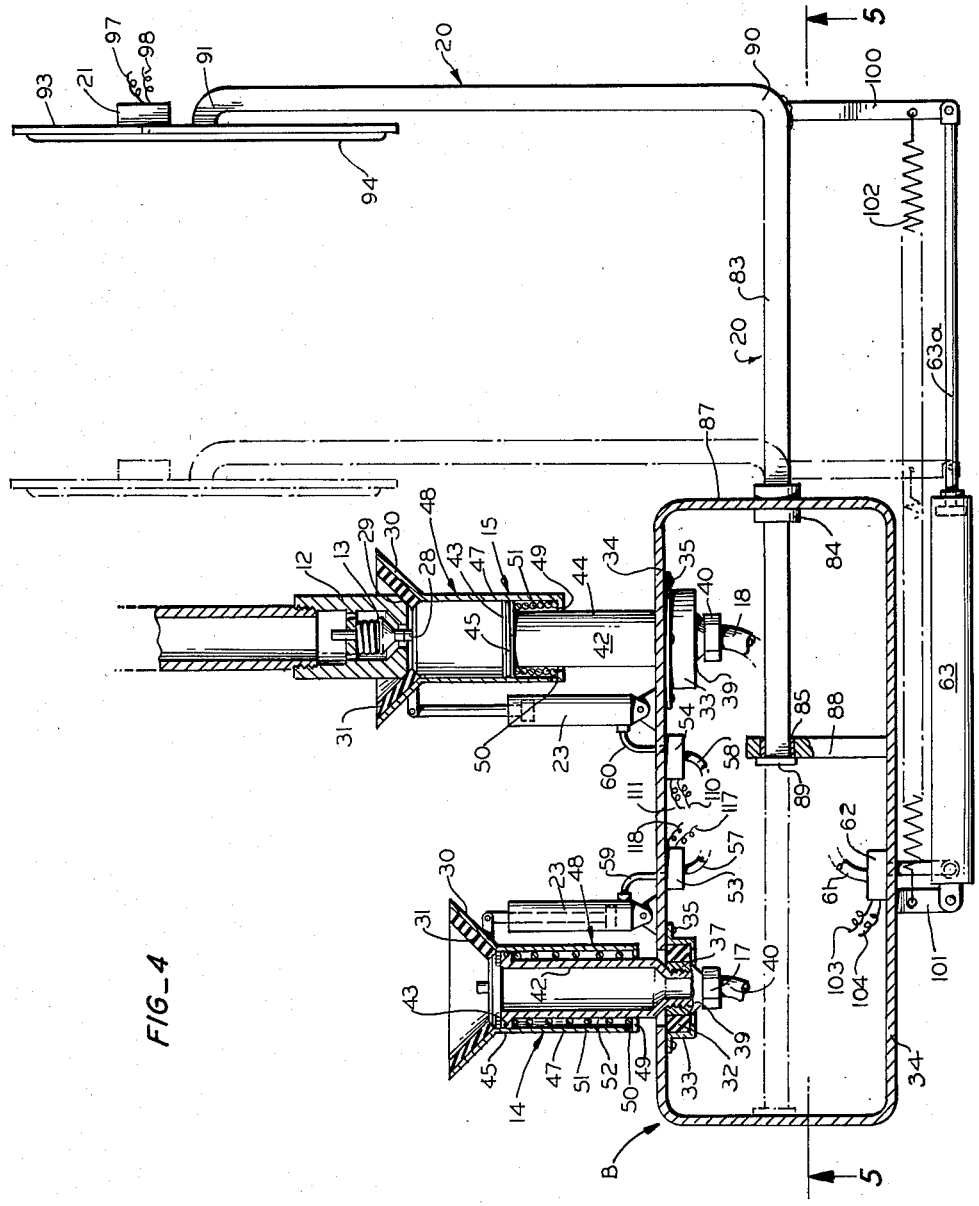

June 25, 1963 L. E. DARWIN 3,095,020
FUELING MECHANISM FOR AUTOMOBILES
Filed Sept. 22, 1960 3 Sheets-Sheet 3
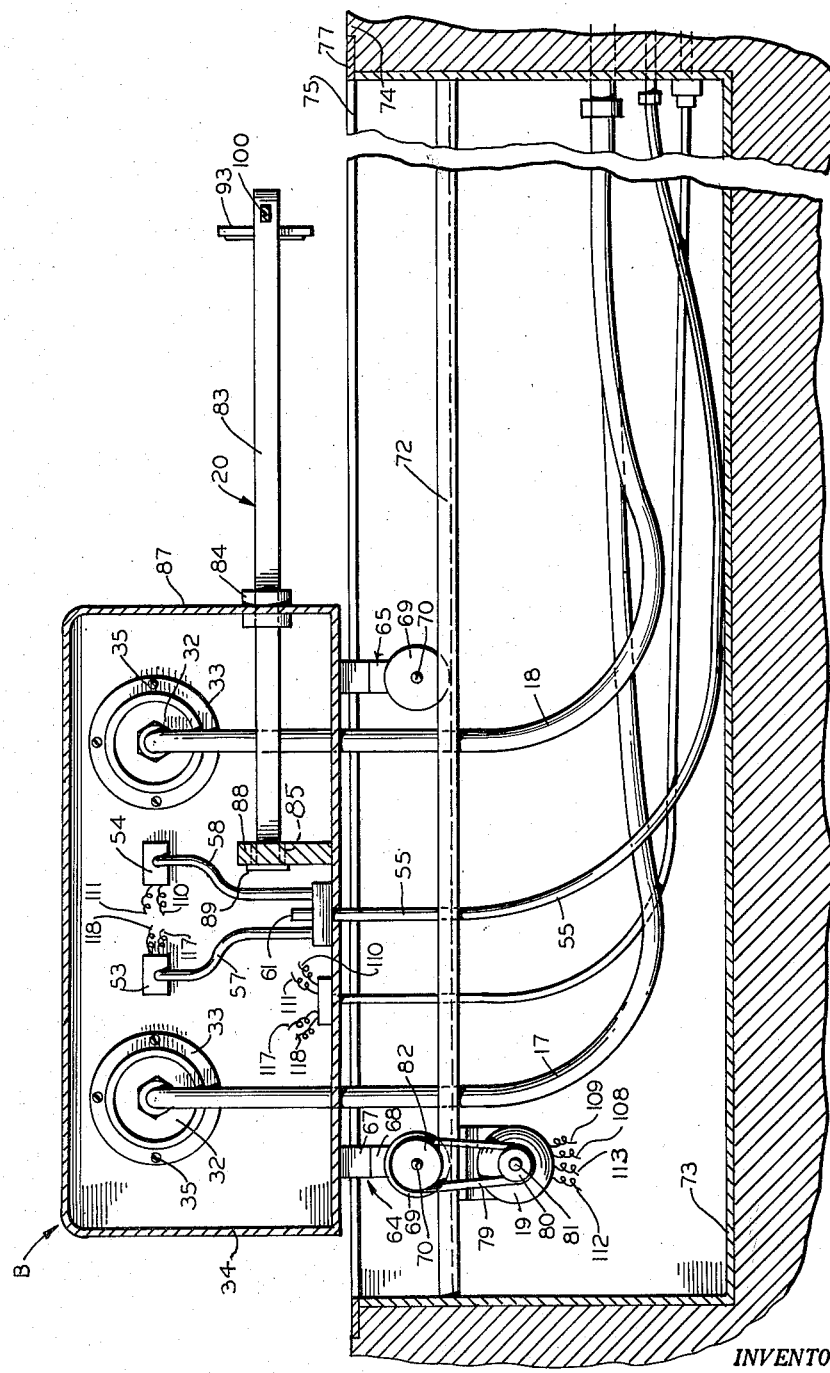
FIG_5
INVENTOR.
LEE E. DARWIN
BY
Hansen and Lane
ATTORNEYS 3,095,020
Patented June 25, 1963

3,095,020
FUELING MECHANISM FOR AUTOMOBILES
Lee E. Darwin, San Jose, Calif.
(924 5th St., Apt. 8, Santa Monica, Calif.)
Filed Sept. 22, 1960, Ser. No. 57,836
6 Claims. (Cl. 141—232)

The present invention relates to an automatic refueling mechanism for automobiles.

An object of the present invention is to provide an improved mechanism for supplying liquid fuel to an automotive vehicle.

Another object is to automatically supply a selected grade of liquid fuel to an automotive vehicle.

The invention also provides a mechanism for quickly coupling a selected one of a plurality of fuel supply nozzles onto a fuel filler line leading to the fuel tank of an automobile, means being provided for aligning the supply nozzle with such fuel filler line.

These, and other objects and advantages of the invention, will be apparent from the following description and the accompanying drawings, wherein:

FIG. 1 is a perspective view showing, in solid lines, a mechanism embodying the invention mounted in the pavement of an automobile service station, and in position for delivering liquid fuel to an automobile, the mechanism being shown retracted in broken lines.

FIG. 2 is an enlarged plan view of the fueling mechanism shown in FIG. 1, the chassis of an automobile being shown in broken lines in position for fueling, the fuel tank and fuel filler line of such automobile being shown in solid lines, the fueling mechanism being shown in solid lines in position to deliver liquid fuel from one fuel nozzle thereof, and in broken lines in position to deliver another grade of liquid fuel from a second nozzle thereon.

FIG. 3 is a further enlarged sectional view taken along line 3—3 of FIG. 2.

FIG. 4 is a horizontal sectional view taken along line 4—4 of FIG. 3.

FIG. 5 is a vertical sectional view taken along line 5—5 of FIG. 4.

Briefly, an illustrative embodiment A of the invention requires the provision of a special fuel filler line 10 communicating with the fuel tank 11 on each automobile which is to be serviced by the present invention. The forward end of this fuel filler line is provided with a quick connecting coupling member 12 (FIGS. 2 and 4) having a self-closing valve 13 (FIG. 4) therein. The coupling member 12 is adapted to have endwise, compressive, sealing engagement with a selected one of a plurality, in this case two, fuel supply nozzles 14 and 15.

The latter are mounted on a carriage B which is adapted to be propelled from inoperative, retracted position B₁ (broken lines, FIG. 1) to operative or fueling position B₂ (solid lines, FIGS. 1 and 2) in front of an automobile C to be serviced. A pair of flexible fuel hoses 17 and 18 connect the nozzles 14 and 15, respectively, to separate computing type fuel pumps, not shown, which may be of a well known kind and which communicate in turn with supplies of two different grades of liquid fuel.

Reversible drive means, such as a conventional reversible electric motor 19 (FIGS. 3 and 5), is provided for propelling the carriage B into and out of a selected filling position with respect to an automobile C in filling position in a service station D.

A carriage positioning arm 20 is mounted on the carriage B and is provided with a surface contact switch 21 for engaging a front tire 22 of an automobile to be serviced for de-energizing the motor 19 when the carriage reaches its selected filling position. A pneumatic cylinder 23 is provided on each of the fuel supply nozzles 14 and 15 for extending a selected one thereof into coupled, sealed engagement with the coupling member 12 on an automobile C to be serviced.

A customer's stand 24 for use by a customer in ordering and paying for fuel purchased is so positioned that when an automobile C is stopped with the filler coupling 12 thereon in proper position for servicing, a driver of such automobile will be alongside this stand.

Referring to the drawings in greater detail, the automobile C may be any conventional automobile using liquid fuel and provided with a usual fuel tank 11. The latter may be provided with a conventional filler pipe 25 (FIG. 2) for use in filling the fuel tank when a service station having fueling means A embodying the present invention is not available. The fuel filler line 10 for use with the present invention extends from the fuel tank 11 to the forward end of the automobile C upon which it is mounted, and there terminates in a forwardly exposed position, preferably below the usual front bumper 27 (FIG. 1). The coupling member 12 preferably is provided with suitable self closing valve means, such as the well known type of spring closing valve 13 (FIG. 4), to exclude dust from the filler line 10 and to prevent a ram-effect draft through the fuel tank 11 which would accelerate evaporation of fuel from the tank. A valve actuating pin 28 mounted centrally of each nozzle outlet may be provided to open the valve 13 when a nozzle 14 or 15 is extended to coupling position as shown at the right in FIG. 4.

The coupling member 12 is provided with an annular seat 29 around its forward end which is adapted to have sealing, coupling engagement with a selected one of the fuel nozzles 14 or 15 when such selected nozzle is moved into axially aligned, pressure engagement therewith as shown in broken lines 15a in FIG. 2, and in solid lines in the right hand nozzle of FIG. 4.

The filling nozzles 14 and 15 are identical, and the parts that are common to both will, therefore, be identified by the same reference numerals. Each nozzle comprises a funnel shaped outer portion 30 (FIG. 4) which is lined with a layer 31 of a suitable resilient sealing material, such as neoprene, which is insoluble in the type of fuel to be delivered. Each of the nozzles is resiliently supported for limited universal tilting movement by screwing the inner end thereof into an internally threaded nozzle support fitting 37, bonded co-axially within a mounting ring 32 of suitable resilient material, such as neoprene. Each resilient mounting ring 32 is fitted into an encircling, marginally overlying, supporting frame 33, which is secured to the inner side of the carriage housing 34 by screws 35. The flexibility thus provided allows each nozzle to properly receive a coupling member 12 therein, even when such coupling member is not exactly aligned therewith.

A threaded hose coupling 40 is provided on each of the fuel supply hoses 17 and 18 for screwing in sealed relation onto the threaded, projecting, inner end portions 39 provided on each of the nozzle fittings 37.

A radially extending flange 43 is provided around the outer end of the cylindrical body portion 44 of each inner nozzle member 42, and a conventional sealing or O-ring 45, which may be of neoprene, is mounted in a groove provided therefor in the periphery of each flange 43. The O-ring 45 has sliding, sealing relation with the interior of the cylindrical body portion 47 of a telescopically mounted outer nozzle member 48 having the funnel shaped coupling portion 30 on its outward end. A radially inturned guide flange 49 is provided on the inner end of the cylindrical body portion 47 of each outer nozzle member 48, and the latter flange has sliding, guiding engagement with the cylindrical exterior of its associated inner nozzle member 42. A vent opening 50 is provided in each outer nozzle member 48 to avoid restriction of relative axial movement of the inner and outer nozzle members 42 and 48.

A coil retraction spring 51 is provided in the space 52 between each associated inner and outer nozzle members 42 and 48, and is held in compression between the flanges 43 and 49 to urge the outer nozzle member 48 axially inwardly toward the retracted position of the left hand nozzle 14 of FIG. 4 after each extension of a nozzle to the position of the right hand nozzle 15 of FIG. 4.

The nozzle extending pneumatic cylinders 23, provided one on each of the nozzles 14 and 15 are actuated selectively by conventional, self-venting, electrically actuated, compressed air valves 53 and 54, respectively. Since such valves, their manner of operation, and the circuits therefor are well known, these details are omitted from the present description.

A compressed air line 55 (FIGS. 3 and 5) is connected by branches 57 and 58 to the inlet side of each of the valves 53 and 54, while the outlets of these valves are connected, respectively, by hoses 59 and 60, to the cylinders 23 for the nozzles 14 and 15, respectively. A third branch 61 (FIGS. 4 and 5) of the compressed air line 55 is connected to the inlet side of a similar electrically actuated, self venting valve 62 associated with a carriage positioning arm actuating cylinder 63. The air line 55 may be supplied with compressed air from a usual supply thereof available at most automobile service stations for inflating tires.

The illustrated nozzle carriage B comprises the box-like housing 34, which rides above-ground and is supported on a pair of similar wheeled support standards 64 and 65. Each support standard 64 and 65 comprises an upper post portion 67 secured at its upper end to the housing 34, and a divided lower portion 68 (FIGS. 3 and 5) in the form of a usual split bearing block.

A pair of support wheels 69 are secured to an axle 70 journaled in each of the standards 64 and 65, and these wheels are supported for rolling movement along a pair of channel shaped tracks 71 and 72, which extend lengthwise in a box-like, underground enclosure or pit 73 which is provided in the pavement 74 of a filling station D. The pit 73 is covered by a steel cover plate 77 of sufficient strength to support the weight of any vehicle which may be driven thereacross. The cover plate 77 has a slotted opening 78 therein a width to permit the post portions 67 of the carriage standards 64 and 65 to move freely therein.

The electric drive motor 19 (FIGS. 3 and 5) is secured beneath the standard 64 and is in driving relation with the axle 70 of one pair of support wheels 69 by suitable means, such as a conventional drive belt 79. The latter passes around a pulley 80 secured to the motor shaft 81, and also a pulley 82 secured to the wheel axle 70. The drive motor 19 is of a well-known reversible type for moving the carriage B between its operative position $B_2$ (solid lines, FIG. 1) in front of an automobile C in filling position in the station D, and its inoperative position $B_1$ (broken lines, FIG. 1) clear of such automobile.

The carriage positioning arm 20 comprises a straight rod portion 83 of non-circular cross-sectional shape for example, square, which is fitted for axial, slidable movement in a pair of correspondingly apertured bushings 84 and 85. The bushings 84 and 85 are secured, respectively, in holes provided therefor in the carriage end wall 87 and a standard 88 mounted within the housing 34. An enlarged head 89 is provided on the free end of the straight rod portion 83. Engagement of the head 89 with the bushing 85 in the standard 88 limits right hand or extending movement of the positioning arm 20, while engagement of the head 89 with the housing end wall limits its left hand or retracting movement. The length of movement of the positioning arm 20 between its solid and broken line positions of FIGS. 2 and 4 is the distance between the axial center lines of the two filling nozzles 14 and 15.

The positioning arm 20 is bent at right angles at 90 and extends a sufficient distance to position a second right angle bend 91 therein laterally opposite a selected element, for example the front wheel tire 22 of an automobile C in servicing position in a station D. A stop plate 93, having a surface switch bar 94 of the switch 21 mounted thereon, is secured transversely to the end of the positioning bar 20.

The switch 21, which may be a conventional micro-switch, is connected in series, by conductors 97 and 98 (FIG. 2) to the forward driving circuit of the motor 19 which propels the carriage B outwardly toward its solid line operative position $B_2$ of FIG. 1. The switch 21 does not affect the reversing circuit of the motor 19 for returning the carriage to its retracted position $B_1$ after a servicing operation has been completed.

The carriage positioning arm 20 preferably is adjusted to a selected one of its two alternate positions of FIGS. 2 and 4 before the carriage B is propelled outwardly toward its servicing position. For thus pre-adjusting the arm 20, the pneumatic cylinder 63 (FIGS. 2 and 4) is mounted between a bracket 100 on the positioning arm 20 and a second bracket 101 on the carriage housing 34. A coil spring 102 is mounted in tension between the brackets 100 and 101 and urges the positioning arm 20 toward its left hand, normal, retracted position relative to the housing 34 as shown in broken lines in FIGS. 2 and 4.

Energizing the electrically actuated valve 62 by a suitable electric current through conductors 103 and 104 opens the valve 62 and admits compressed air to the cylinder 63, thereby extending a piston rod 63a connected to a usual piston, not shown, in the cylinder 63. This action moves the positioning arm 20 against the tension of the spring 102 to its extended position of FIGS. 2 and 4. De-energizing the self-venting valve 62 by cutting off such current allows the coil spring 102 to return the positioning arm 20 and the piston rod 63a to their normal, retracted positions shown in broken lines in FIG. 4.

Electrical current may be supplied to the conductors of the various electrically actuated elements of the illustrative mechanism A from a usual supply line, and may be controlled by conventional switches (not shown except for micro-switch 21), either manually or by means of suitable auxiliary mechanisms which form no part of the present invention.

The operation of the illustrated embodiment A of the invention is as follows: The driver of an automobile C having a fuel filling line 10 and coupling member 12 thereon, and wishing a supply of liquid fuel, drives his automobile C into the filling station A closely adjacent the stand 24. He drives slowly straight ahead until the front wheels of his automobile seat in a shallow recess 105 or other suitable positioning means, thus indicating that his automobile is in proper position for servicing. In this position of his automobile the driver will be located alongside the service stand 24 with his front wheels in straight ahead driving position. He then, either by use of a microphone 107 on the service stand 24 or by other suitable means, not illustrated, and not material to the present invention, orders the volume and type of fuel desired. In the event that it is necessary for the driver of the vehicle being fueled to transmit anything, such as a credit card or money, to an attendant in the station, or to receive change or other things from the attendant, suitable conveying means such as a conventional pneumatic conveying tube indicated by the broken lines 115 in FIG. 1 may be provided.

The first step in accomplishing the delivery of the selected type of fuel is to pre-position the carriage positioning arm 20 so as to align the nozzle 14 or 15 which delivers this selected type of fuel with the coupling member 12 on the automobile C to be serviced. Assuming that fuel is to be delivered from the right hand nozzle 15, the arm 20 is extended to its solid line position of FIGS. 2 and 4. This is accomplished by supplying suitable electric current to the conductors 103 and 104 to thereby energize and open the self-venting compressed air control valve 62, thereby admitting compressed air from the line 55 to the arm-extending pneumatic cylinder 63.

With the positioning arm 20 thus extended, the carriage drive motor 19 is next energized by supplying suitable electric current to conductors 108 and 109 which are connected to drive the motor 19 in a forward direction to propel the carriage B outwardly from its broken line position $B_1$ toward its solid line position $B_2$ of FIG. 1. As mentioned previously herein the surface contact arresting switch 21 of the positioning arm 20 is connected in series in this outwardly propelling circuit of the motor 19.

The motor 19 continues to propel the carriage B outwardly until the surface switch bar 94 of the arresting switch 21 engages the tire 22 of the automobile C to thereby open the outward driving circuit of the motor 19, thereby permitting the carriage positioning arm 20 to arrest the carriage B in the position shown in solid lines in FIG. 2. In this position of the carriage the right hand nozzle 15 is aligned with the coupling member 12. Electrical current is then supplied to conductors 110 and 111 of the right hand nozzle-extending pneumatic cylinder 23 (FIGS. 2 and 4), thereby moving the telescoping outer nozzle member 48 axially outwardly to its broken line position of FIG. 2 (solid line position at the right in FIG. 4). This seats the resilient conical liner 31 of the right hand nozzle 15 in sealing relation on the seat 29 around the forward end of the coupling member 12, and simultaneously, by means of the pin 28 (FIG. 4), opens the spring-closing valve 13 in the coupling member. Liquid fuel is then supplied through the fuel hose 18, nozzle 15, coupling member 12 and fuel line 10 to the automobile tank 11 as by means of a conventional, computing-type gasoline pump, not shown.

When the required volume of gasoline ordered by the customer has been delivered, the pump supplying the fuel is shut off in a usual manner. The electric current to the self-venting valve 54 which controls the nozzle extending cylinder 23 for the nozzle 15 is then cut off to de-energize said valve. This shuts off the supply of compressed air from the branch air line 58 to said cylinder and vents the cylinder 23 in a conventional manner for such valves, thus allowing the spring 51 to return the nozzle 15 to its retracted position as shown at the left of FIG. 4.

The motor reversing circuit for the motor 19 is then closed, as through conductors 112 and 113 (FIGS. 3 and 5), to reverse the drive motor 19, which thereupon propels the carriage B to its retracted, broken line position $B_1$ of FIG. 1. The electrical current is shut off to the positioning arm self-venting valve 62, thereby de-energizing said valve and venting the cylinder 63. The spring 102 thereupon retracts the positioning arm 20 to its normal, broken-line position of FIG. 4.

In the event that it is desired to supply fuel from the left hand nozzle 14, the same operational sequence is followed as that described previously herein for the nozzle 15, with the exception that the positioning arm 20 is left in its normal, retracted position throughout the servicing operation, and the nozzle 14 is moved to its extended position when required by electric current applied to conductors 117 and 118 of the self venting valve 53 of the nozzle 14.

The invention provides a simple, accurate and positively operating fueling mechanism for automotive vehicles. With the present invention a single attendant can easily supply the fueling requirements of numerous automobiles at different servicing points similar to the installation A of FIG. 1. Obviously the invention invites the use of additional automatic actuating circuits and mechanisms. The invention is intended to supply only the fueling requirements of motor vehicles. A servicing area (not shown) may be provided in the station D for supplying other wants of customers, such as oil, air, water, windshield cleaning, tire and battery service, and others. Since, however a great many service station customers require only fuel, and are usually in a hurry, the present invention permits this requirement to be supplied rapidly and with a minimum of personnel time.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. In a service station, a fueling mechanism for use with an automobile having a fuel tank with a fuel filler line communicating at one end thereof with the interior of such tank, and having a coupling member on the other end of such fuel line in a selected, fixed, exposed location, such coupling member being spaced a selected distance from a reference member of such automobile; said fueling mechanism comprising means for locating such automobile in a servicing position in the service station, a fuel supply carriage mounted in such service station adjacent a servicing position of an automobile in the station, a fueling nozzle on said carriage and formed to be automatically actuated to have quick coupling engagement with a coupling member on such automobile, drive means for propelling said carriage toward and away from such automobile in servicing position in the station, positioning means spaced from the nozzle by the same selected distance as that separating a reference member from a coupling member on such automobile for positioning the filling nozzle in alignment with a coupling member on such automobile, and selectively actuable means for extending the nozzle into coupled engagement with such coupling member in alignment therewith, whereby liquid fuel flowing through said extended nozzle passes through such coupling member and filler pipe into a fuel tank of such automobile.

2. In an automobile service station, fueling mechanism for use with an automobile having a fuel tank with a fuel filler line communicating at one end thereof with the interior of such tank, and having a coupling member on the other end of such fuel line in a selected, fixed, exposed location, such coupling member being spaced a selected distance from a reference member of such automobile; said fueling mechanism comprising means for locating such automobile in servicing position in such filling station, a fuel supply carriage mounted in such service station for movement back and forth along a path from a retracted position adjacent a servicing position of an automobile in such station toward an automobile in such servicing position, a pair of extensible fueling nozzles on said carriage, each nozzle being formed and positioned to have quick coupling engagement with a coupling member on such automobile, said nozzles being spaced laterally apart in the direction of carriage movement, reversible drive means for propelling said carriage in a selected direction along its path, adjustable positioning means normally spaced from one of said nozzles by the same selected distance as that separating a reference member from a coupling member on such automobile for positioning said one nozzle in register with a coupling member on such automobile, means for adjusting said positioning means to said same distance from the other of said nozzles, and means for selectively extending one of said nozzles into coupled engagement with a coupling member in register therewith, whereby liquid fuel flowing through the selected extended nozzle passes through such coupling member and filler pipe into a fuel tank of such automobile.

3. In an automobile service station, fueling mechanism for use with an automobile having a fuel tank with a fuel filler line communicating at one end thereof with the interior of such tank, and having a coupling member on the other end of such fuel line in a selected, fixed, exposed location; said fueling mechanism comprising means for locating such automobile in servicing position in the station, a track in said station adjacent a servicing position of an automobile therein, a carriage mounted for guided movement back and forth along said track, a plurality of extensible fueling nozzles mounted on said carriage in laterally spaced relation in the direction of carriage movement along the track, and formed to have quick coupling engagement with a coupling member on such automobile, drive means for propelling said carriage selectively back and forth along said track, a positioning arm movably mounted on said carriage and movable to a number of positions corresponding to the number of nozzles on the carriage, means biasing the positioning arm toward a selected one of its positions for positioning a first selected nozzle in register with a coupling member on such automobile, means for selectively moving the positioning arm lengthwise of said track a distance equal to the lateral separation between adjacent nozzles to thereby align another selected one of said nozzles with such coupling member, and means for extending each selected nozzle into coupled engagement with a coupling member in register therewith, whereby liquid fuel flowing through said extended nozzle passes through such coupling member and filler pipe into a fuel tank of such automobile.

4. In an automobile service station, fueling mechanism for use with an automobile having a fuel tank with a fuel filler line communicating at one end thereof with the interior of such tank, and having a coupling member on the other end of such fuel line in a selected, exposed location; said fueling mechanism comprising means for locating such automobile in servicing position in the station, fuel supply nozzle support means movably mounted in the station adjacent a servicing position of an automobile therein, an extensible fueling nozzle on said nozzle support means and formed to be automatically actuated to have quick coupling engagement with a coupling member on such automobile, means for moving the nozzle support means from a position clear of such automobile and with the nozzle out of alignment with such coupling member toward such automobile, positioning means for arresting movement of the nozzle support means toward such automobile with the nozzle on said nozzle support means in alignment with, and spaced from, a coupling member on such automobile, and selectively actuable mechanical means for extending said nozzle into coupled engagement with such coupling member in alignment therewith, whereby liquid fuel flowing through said extended nozzle passes through such coupling member and filler pipe into a fuel tank of such automobile.

5. In an automobile service station, fueling mechanism for use with an automobile having a fuel tank with a fuel filler line communicating at one end thereof with the interior of such tank, and having a coupling member on the other end of such fuel line in a selected, fixed, exposed location, such coupling member being spaced a selected distance from a reference member of such automobile; said fueling mechanism comprising means for locating such automobile in servicing position in the station, a pit extending transversely of an automobile in such servicing position, a track mounted to extend lengthwise within said pit, a carriage mounted for guided movement back and forth along said track, a pair of extensible fueling nozzles mounted on said carriage in laterally spaced relation in the direction of carriage movement along the track, and formed to have quick coupling engagement with a coupling member on such automobile, reversible drive means for propelling said carriage between a position laterally beyond an automobile in servicing position in the station, toward such automobile, a positioning arm movably mounted on said carriage and selectively movable in the direction of carriage movement along the track between two positions spaced apart by the distance separating said nozzles, and means for selectively moving said positioning arm between the two positions thereof, said positioning arm being mounted to engage a reference member of such automobile for arresting movement of the carriage toward such automobile for positioning a selected one of said nozzles in register with a coupling member on such automobile in each selected position of the positioning arm.

6. An automatic fueling mechanism for use with an automobile having a fuel tank with a fuel line having an end thereof coupled to the interior of the fuel tank and a coupling member at the other end thereof positioned at a preselected location on the automobile with respect to a reference element on the automobile, the combination of which comprises; a movable fuel supply carriage, a fuel supply nozzle mounted on said fuel supply carriage and formed to be automatically actuated to have quick coupling engagement with a coupling member on an automobile, means for locating an automobile in a servicing position, detecting means for sensing a reference element positioned at a prearranged position with respect to the coupling member on na automobile in a servicing position, drive means coupled to be responsive to the detecting means for propelling the fuel supply carriage to a position wherein said fuel nozzle is in alignment with the coupling member on an automobile in a servicing position, and selectively actuable means for extending the aligned fuel nozzle into coupling engagement with the coupling member on an automobile in a servicing position whereby liquid fuel flowing through said fuel nozzle passes through the coupling member and fuel line into the fuel tank of the automobile.

References Cited in the file of this patent
UNITED STATES PATENTS

| | | |
|---|---|---|
| 983,974 | Briggs | Feb. 14, 1911 |
| 2,583,181 | Kunz | Jan. 22, 1952 |
| 2,611,523 | Aines | Sept. 23, 1952 |
| 2,683,902 | Estel | July 20, 1954 |
| 2,881,810 | Breitenstein | Apr. 14, 1959 |